United States Patent [19]

Park

[11] Patent Number: 5,363,144
[45] Date of Patent: Nov. 8, 1994

[54] TELEVISION GHOST CANCELING DEVICE

[75] Inventor: Hyung M. Park, Seoul, Rep. of Korea

[73] Assignee: Goldstar Co., Ltd., Seoul, Rep. of Korea

[21] Appl. No.: 46,702

[22] Filed: Apr. 16, 1993

[30] Foreign Application Priority Data

Apr. 16, 1992 [KR] Rep. of Korea ............... 1992-6403
Dec. 30, 1992 [KR] Rep. of Korea ............... 1992-26682

[51] Int. Cl.$^5$ ............................................. H04N 5/38
[52] U.S. Cl. ................................................ 348/614
[58] Field of Search ................. 358/187, 905, 167; 348/614; H04N 5/21, 5/213, 5/38

[56] References Cited

U.S. PATENT DOCUMENTS

| | | | |
|---|---|---|---|
| 4,703,357 | 10/1987 | Ng et al. ............... | 358/187 X |
| 4,980,767 | 12/1990 | Chao et al. ............ | 358/187 |
| 5,117,291 | 5/1992 | Fadavi-Ardekani et al. ... | 358/187 X |

*Primary Examiner*—Victor R. Kostak
*Attorney, Agent, or Firm*—Morgan & Finnegan

[57] ABSTRACT

The present invention relates to a television ghost canceling device applied with a ternary sequence ghost cancellation reference signal, which comprises: a ternary sequence generating section included in a transmitting section of television system and for generating a training signal inserted within a vertical flyback time period of video signal to be modulated in radio frequency; a demodulating section included in a receiving section of television system and for receiving a transmission signal of the transmitting section and for demodulating to an original video signal; a line selecting section for selecting a line inserted with a training signal of vertical flyback time periods of video signal demodulated at the demodulating section; a memory stored with a ternary sequence reference signal corresponding to a training signal generated at the ternary sequence generating section; a cross-correlating section for computing a cross-correlation of the reference signal and the training signal whereby finding out a ghost channel; and a ghost canceling filter for canceling the ghost of video signal in accordance with a filter coefficient value of the ghost channel.

8 Claims, 4 Drawing Sheets

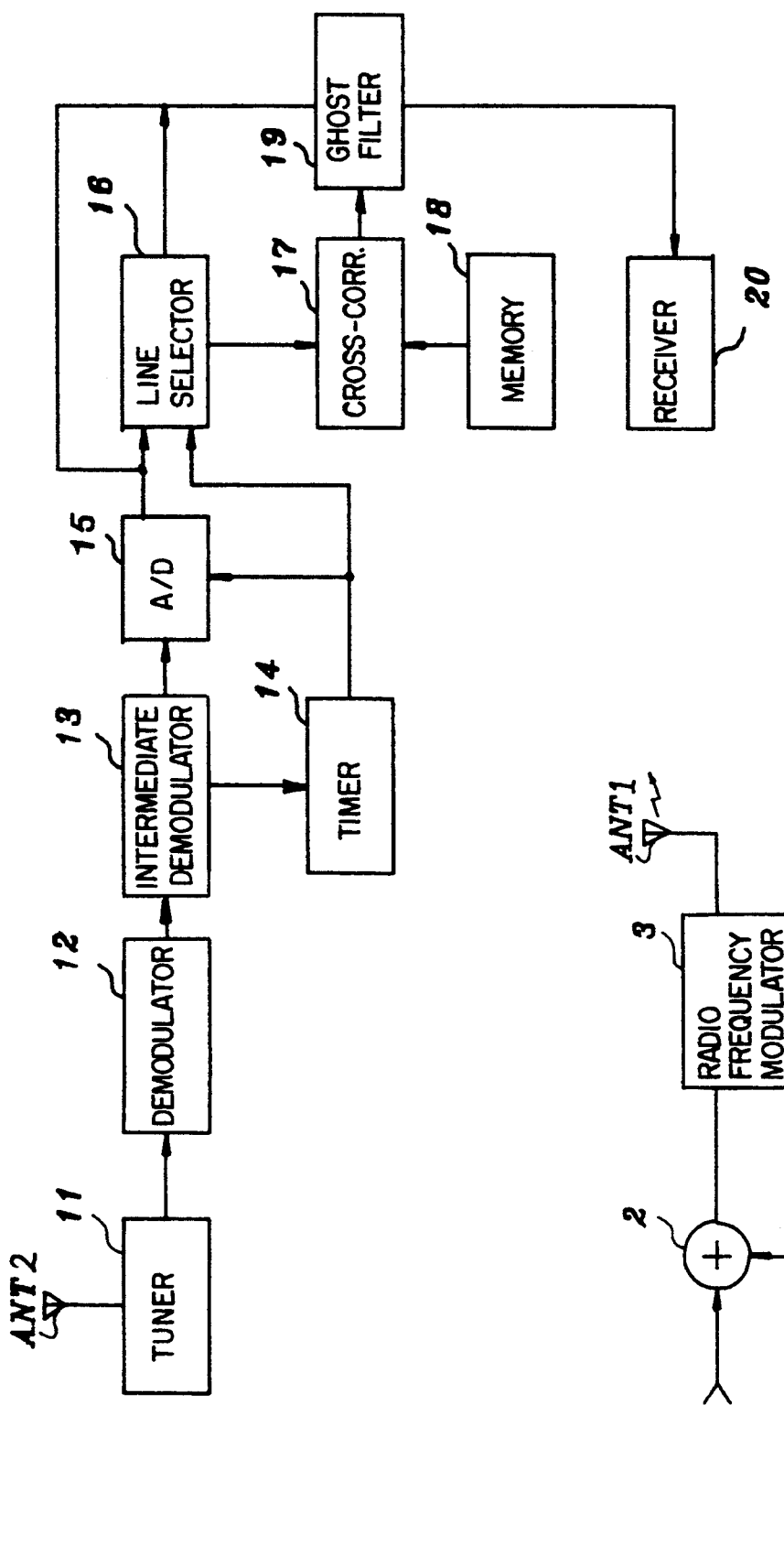

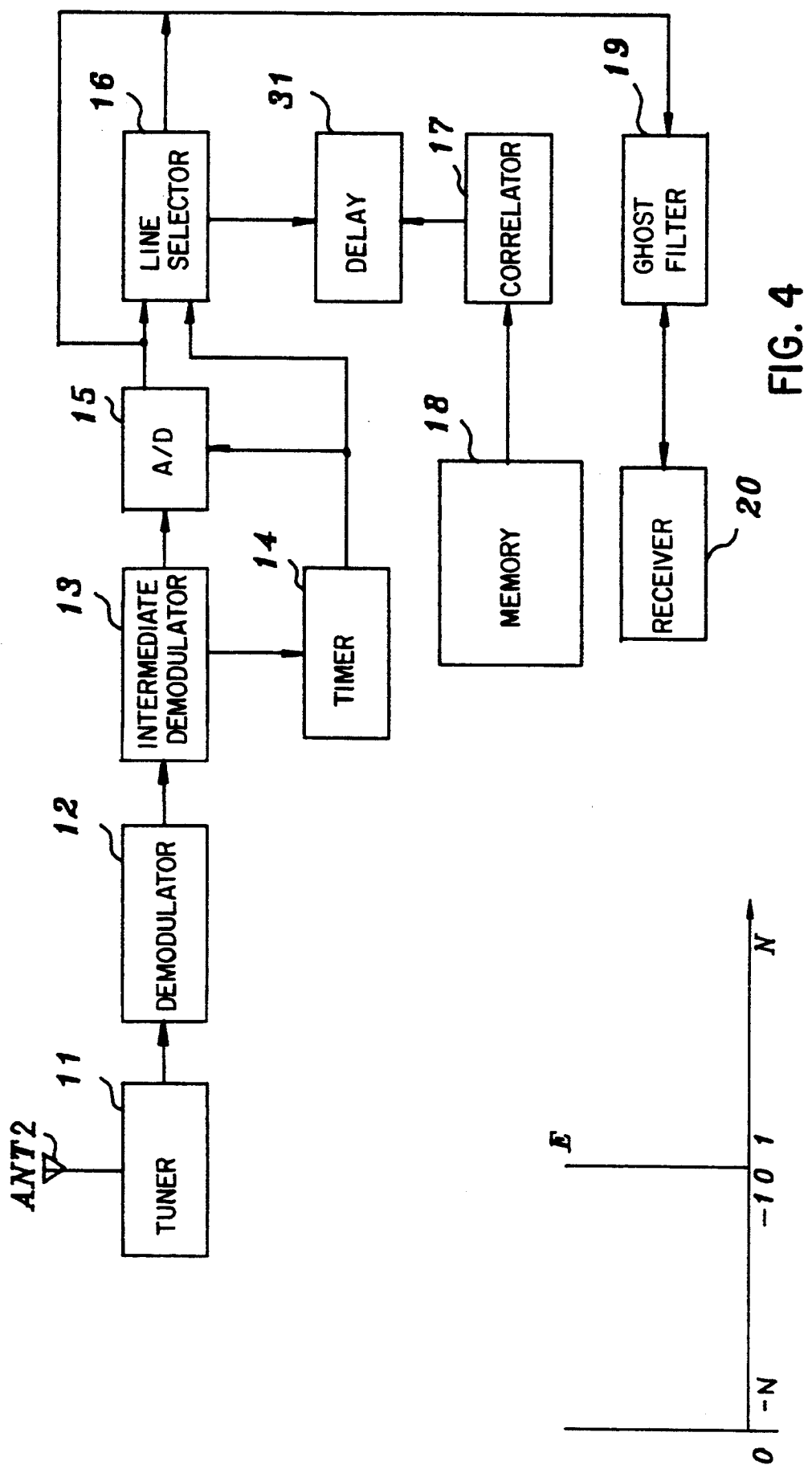

TELEVISION GHOST CANCELING DEVICE

FIELD OF THE INVENTION

The present invention relates to a television ghost cancelling device, and more particularly to a television ghost cancelling device applied with a ternary sequence as a ghost cancelling reference signal.

BACKGROUND OF THE INVENTION

There are various kinds of reasons in which a receiving picture becomes deteriorated by various propagation troubles when receiving a television broadcast. The ghost is known as one of major causes deteriorating the television picture quality.

The ghost appears as a faint image at a position out of original picture in the television screen, and which is made by a multiple path channel by a reflecting body such as a building, mountain, and airplane. The multiple path channel is also made by a cause such as a mismatching of impedance in a cable system such as a local video network.

The ghost is generally divided into a preghost and a proximity ghost and a postghost of a long ghost in accordance with delay time on the basis of main signal. The preghost is a ghost in which a signal of strongest magnitude reached later than a directly transferred signal is made to a main signal whereby be produced.

The proximity ghost is within 1-2 µs in delay time, and generally it is not seen as a divided picture, but gives much injury to the main picture. The long ghost is a case that the delay time is more than 25 µs, and its attenuation constant is less than the proximity ghost. These ghosts are the problem to be solved in order to obtain a better picture quality as far as a ground wave system broadcasting and a cable broadcasting are present, and particularly a ghost cancelling function is indispensable in a high quality television system such as EDTV and HDTV.

The ghost canceling system which is presently used or in researching is a method for transferring by inserting a ghost cancellation reference GCR signal for the ghost cancellation during a vertical flyback (i.e., a blanking interval) time period, and a chirp signal, a pseudonoise sequence and the like are already known.

In order to effectively cancel the ghost, it is done if a filtering confirming a transferring channel and becoming a reciprocal of its transferring function is made. In cancelling a ghost by finding out a transferring channel, it is indispensable to use a ghost cancellation reference signal which is a kind of training signal. And, generally a common principle is utilized in which a main signal is delayed and this signal is coincided with the ghost signal on a time axis.

The delayed main signal is so attenuated that its amplitude becomes same as an amplitude of the ghost signal. This signal is converted to generate a signal known as a pseudoghost signal. For a generation of the pseudoghost signal, a presence and a delay degree or a position on time of the ghost signal against the main signal have to be discriminated. This is made by sensing a characteristic of video signal component of publicly known characteristic called as generally a training signal. In case that a video signal is injured by a ghost signal, since a corresponding ghost of the training signal would be appeared during aforementioned interval, the ghost can be easily detected and analyzed. A typical training signal used for the ghost detection and offsetting can be inserted within a vertical flyback time period of a time being not used.

In a television system using a pseudonoise sequence as a ghost cancellation reference signal, a pseudonoise sequence generator memorized with a pseudonoise sequence is provided to a transmitting section and becomes to generate a training signal. This training signal is inserted to one line during the vertical flyback canceling section whereby becomes to transfer to a receiving section of the television system. When a ghost signal is mixed to the television signal, the receiving section of the television system becomes to trace a time position of the ghost signal. The traced ghost signal is made to be an inverse channel at a transversal filter, and be coupled with a video signal mixed with the ghost signal and becomes to offset the ghost.

However, the television ghost canceling device using a pseudonoise sequence as this as a training signal, since the pseudonoise sequence is a binary sequence, in case when a noise is present in the transmitting channel, an error variance value of a ghost channel characteristic evaluation becomes to be increased as much as $2N/(N+1)$ (N is a constant) times than the noise variance value. And, in case of having a self cross-correlation being a $T=0$ by a comparison of sequence being N in length in accordance with a characteristic of the noise sequence, a peak value being N is appeared, but when having a self cross-correlation having a delay being $T=0$, an offset of the ghost canceling means becomes produced.

Further, since the ghost is canceled by using a period sequence as a ghost cancellation reference signal, an output of the cross-correlating means computing the ghost channel characteristic can not clearly discriminate the preghost, postghost and proximity ghost because of a periodic property of the reference signal. Accordingly, there is a problem that a ghost cancelling extent has to be less than a sequence length. This can be solved by sending a sequence being different in length one another with a transfer of the reference signal and discriminating the preghost and postghost by utilizing these two sequences in a receiving set, but in this case also, there is a problem which is rot possible to cancel the postghost distanced away than the sequence length.

SUMMARY OF THE INVENTION

Therefore, the present invention aims to solve such problems, and it is an object of the present invention to provide a television ghost canceling device using a ternary sequence training signal.

Another object of the present invention is to provide a television ghost canceling device which is made to be able to clearly discriminate a preghost, postghost and a proximity ghost.

These objects and other objects are accomplished by comprising: a ternary sequence generating section for generating a training signal inserted into a vertical flyback time period of video signal to be included to a transmitting section of the television system and to be modulated in radio frequency; a demodulating section which is included to a receiving section of the television system and for receiving a transmitting signal of the transmitting section and demodulating to an original video signal; a line selecting section for selecting a line inserted with a training signal of the vertical flyback time period of the video signal demodulated at the demodulating section; a memory stored with a ternary sequence reference signal corresponded to a training signal generated at the ternary sequence generating section; a cross-correlation section for computing a cross-correlation of the reference signal and the training signal and for finding out a ghost channel; and a ghost cancelling filter for cancelling the ghost of video signal in accordance with a filter coefficient value of the ghost channel.

BRIEF DESCRIPTION OF THE DRAWINGS

FIG. 1 is a block diagram of a transmitting section of the television system in accordance with the present invention, FIG. 2 is a block diagram of a receiving section of the television system in accordance with the present invention, FIG. 3 is a characteristic diagram of a ternary sequence self cross-correlation function, FIG. 4 is a block diagram of a receiving section of the television system in accordance with the present invention, FIG. 5 is a detailed circuit diagram of a signal delay adding section and a cross-correlation section of FIG. 4, FIG. 6s are input and output wave form charts of the signal delay adding section of FIG. 4, in which

DETAILED DESCRIPTION OF THE INVENTION

Figure 5:
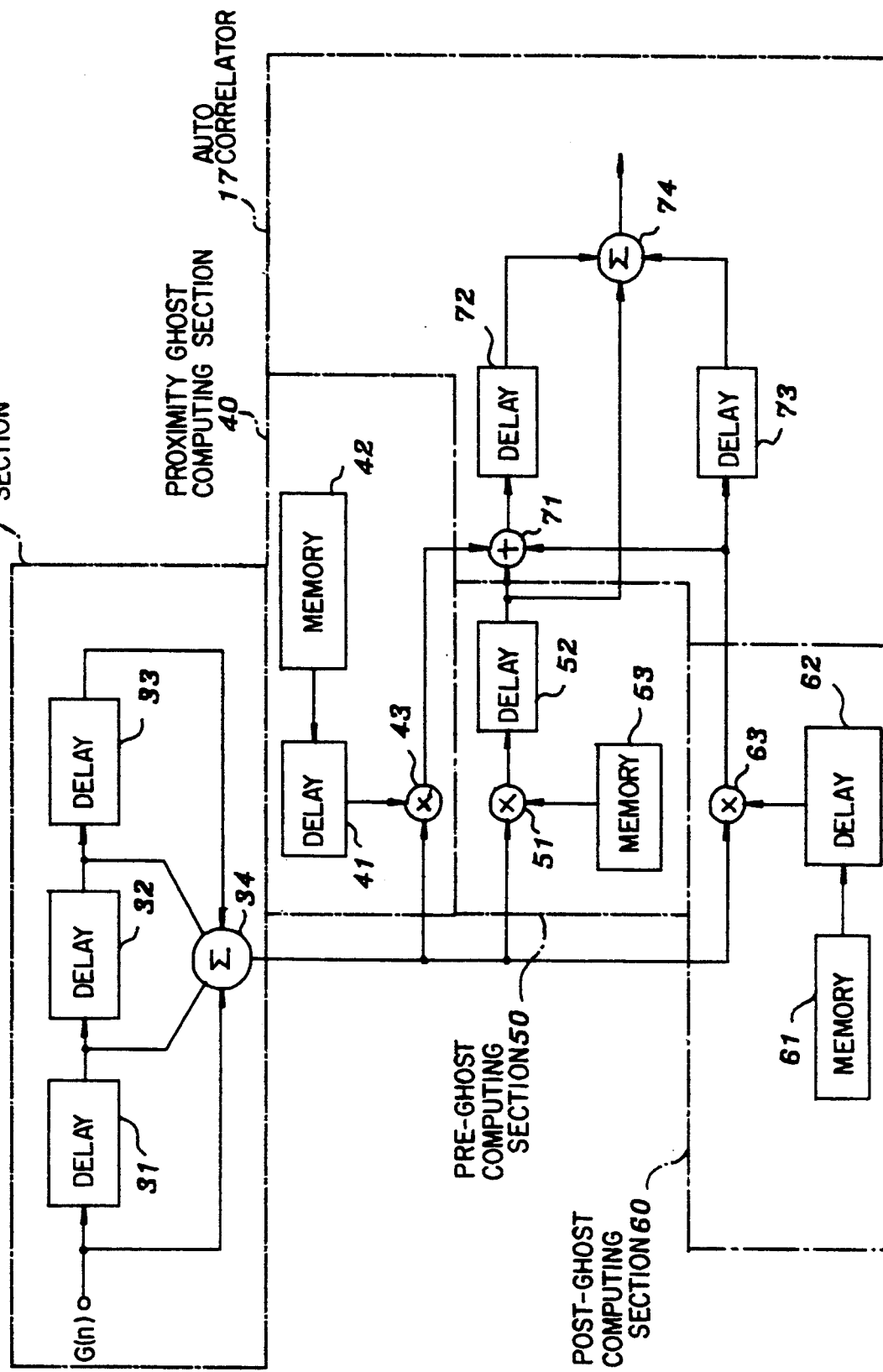

Hereinafter, the present invention will be described more in detail with reference to the accompanying drawings.

FIG. 1 is a block diagram of a transmitting section of the television system in accordance with the present invention, which includes a ternary sequence generating section 1. The ternary sequence generating section 1 reads in a ternary sequence from a memory contained within its interior and executes a low frequency band pass filtering and converts an analog signal.

The ternary sequence of the present invention can be obtained by a process as followings. Firstly obtaining a primitive polynomial of GF(q) state for a prime number q and computes M-sequence by utilizing this polynomial. The M-sequence computed as this is corresponded by bi being a ternary sequence by a following relational expression.

$$\theta(\alpha) = \begin{bmatrix} 0, \alpha = 0 \in GF(q) & bi = (-1)^i \theta(ci), \\ \psi(\alpha), \alpha \in G & i = \ldots, -1, 0, 1, \ldots \end{bmatrix}$$

Wherein G is a set of circle being not a 0 of GF(q), and is an any circle of G, ci is a recursive sequence made of a circle of GF(q), and it is computed by $\psi(\alpha)=(-1)^u$, $0 \leq u \leq q-2$.

The ternary sequence obtained as this has an ideal periodic autocorrelation function as follows when a period is N.

$$R(m) = \begin{matrix} q^{n-1} & m = 0 \pmod{N} \\ 0, & m \neq 0 \pmod{N} \end{matrix}$$

The ternary sequence converted to an analog signal is inserted to any one line during a vertical flyback time period in the line inserting section 2 and outputted with video signal. This output signal is modulated to a radio frequency band at the radio frequency modulating section 3 and then transmitted to a television receiving section through a transmitting antenna ANT1.

FIG. 2 is a block diagram of a receiving section of the television system in accordance with the present invention, which includes a ternary sequence reference signal memory 18, As shown in the drawings, the receiving section of the present invention comprises: a receiving antenna ANT2 for receiving a television signal transmitted through the transmitting antenna ANT1 of the transmitting section; a tuner 11 for selecting a television channel; a radio frequency demodulating section 12 for demodulating a radio frequency signal to an intermediate frequency signal; an intermediate frequency demodulating section 13 for demodulating the intermediate frequency signal to a basic low frequency band signal; a timing generating section 14 for generating a clock signal from the basic low frequency band signal; A/D converter 15 for converting the basic frequency band analog signal to a digital signal; a line selecting section 16 for selecting a line inserted with a ternary sequence of a vertical flyback time period in the basic low frequency band signal; a memory 18 stored with a reference signal of ghost cancellation corresponding to the ternary sequence transmitting from the transmitting section; a cross-correlation section 17 for computing a cross-correlation of the reference signal and the selected line and finding out the ghost channel; a ghost cancelling filter 19 made of finite invariant response FiR filter and infinite invariant response IiR filter cancelling the ghost within the television signal; and a television receiver 20 for outputting a television signal cancelled with the ghost to a picture.

Explaining an operation of the receiving section of the television system of the present invention, the tuner 11 becomes to select a signal of desired channel by a user from the radio frequency wave signals received at the antenna ANT2. The radio frequency signal selected at the tuner 11 is inputted to the radio frequency demodulating section 12 and then demodulated and outputted to an intermediate frequency signal.

The intermediate frequency demodulating section 13 demodulates the intermediate frequency signal to a basic low frequency band signal and outputs to a timing generating section 14 and A/D converter 15. The timing generating section 14 generates a sampling clock signal (4 fsc) required to the ghost cancellation from the inputted horizontal synchronizing signal and chrominance subcarrier and outputs to the A/D converter 15.

The A/D converter 15 samples the basic low frequency band signal being an output signal of the intermediate frequency demodulating section 13 by utilizing the clock signal outputted from the timing generating section 14 and outputs to a digital signal. The line selecting section 16 selects a line inserted with a ghost canceling signal of the vertical canceling section in accordance with the clock signal of the timing generating section 14 of the digital signal outputted from the A/D converter 15.

The cross-correlation section 17 computes a cross-correlation of the ternary sequence selected by the line selecting section 16, i.e., the training signal and the ternary sequence stored in the memory 18 and the reference signal and makes a ghost channel characteristic and outputs to a computed ghost cancellating filter 19.

The ghost canceling filter 19 is applied with not only the training signal of the line selected by the line selecting section 16 but also the output signal of the A/D converter 15 and cancels the inserted ghost within the television signal by FiR filter and IiR filter by utilizing a ghost cancelling filter coefficient value in accordance with the ghost channel characteristic of the cross-correlation section 17. The television receiving section 20 is applied with a television signal through the ghost cancelling filter 19 and outputs a clear picture.

In accordance with the present invention, the ternary sequence is used as a ghost cancellation reference signal so that an ideal autocorrelation function characteristic having a peak value only at a zero shift position as shown in FIG. 3 becomes appeared. That is, a peak value E is appeared when the time delay is absent, while zero value is appeared when the time delay is present. This is an important content for an offset problem solving of DC in accordance with the ghost cancellation.

FIG. 4 is a block diagram of the receiving section of the television system in accordance with an execution in accordance with the present invention, in which same reference numeral symbols represents same part or portion. As will be seen from the drawings, the configuration is same as FIG. 2 except that a signal delay adding section 30 is added.

The signal delay adding section 30 changes the input signal so as to execute a linear cross-correlation computing the training signal of the line selected at the line selecting section 16 and the ternary sequence reference signal stored to the memory 18 at the cross-correlation section 17.

FIG. 5 is a detailed circuit diagram of the signal delay adding section 30 and the autocorrelation section 17 of FIG. 4, and the autocorrelation section 17 comprises line delayers 31, 32, 33 being three and an adder 34. The autocorrelation section 17 comprises a proximity ghost channel characteristic computing section 40, a preghost channel characteristic computing section 50, and a postghost channel characteristic computing section 60.

The proximity ghost channel characteristic computing section 40 comprises one line delay section 41, a proximity reference signal memory 42 and a cross-correlater 43, and the preghost channel characteristic computing section 50 comprises a preghost reference signal memory 53 and a cross-correlater and a line delay section 52.

The postghost channel characteristic computing section 80 comprises a postghost reference memory 61, a line delay section 62 and a cross-correlater 63. And, the cross-correlation section 17 further includes an adder 80 for adding a preghost characteristic value and a postghost characteristic value to a proximity ghost channel characteristic value for computing the ghost characteristic of whole extent; line delayers 72, 73 for aligning a position of the proximity ghost channel characteristic and a position of the postghost channel characteristic and an adder 74 for adding the ghost characteristic of final whole extent.

Explaining the operation, the line selecting section 16 selects a line inserted with a training signal of the television signal by a line signal and outputs to a signal delay adding section 30. A signal inputted to the signal delay adding section 30 is delayed as much as the reference signal length by passing through in turn the line delayers 31, 32, 33.

Figure 6A:
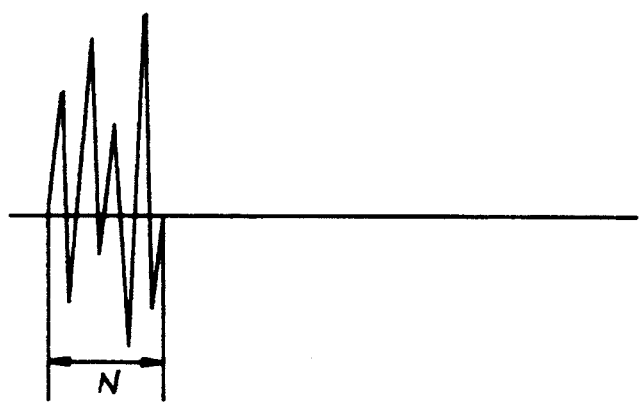
FIG. 6(A) is an input wave form chart.
Figure 6B:
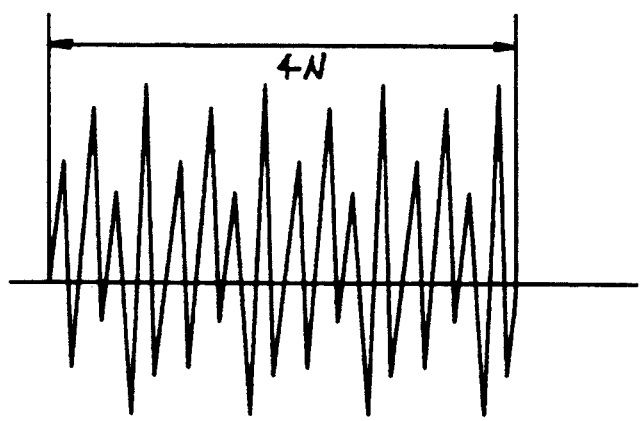
FIG. 6(B) is an output wave form chart.

FIG. 6(A) is a wave form chart of input of the signal delay adding section 30, FIG. 6(B) is a wave form chart of output of the signal delay adding section 30. This input wave form and output wave form are inputted to the cross-correlation section 17. The output wave form of the signal delay adding section 30 passes through the preghost channel characteristic computing section 50 and the proximity ghost channel characteristic computing section 40 and it is inputted to an adder, and the input wave form of the signal delay adding section 30 passes through the postghost channel characteristic computing section 60 and it is inputted to an adder 74 through the line delay section 73.

The cross-correlation section 17 computes three channel characteristic values of the preghost region, proximity ghost region and postghost region by using three cross-correlation circuits 40, 50, 60.

Figure 7A:
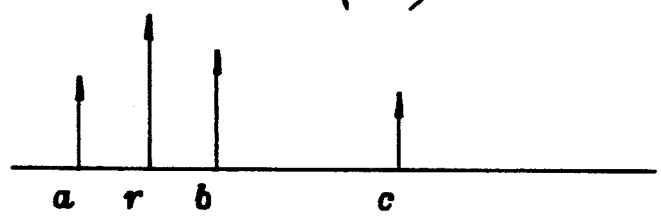
FIGS. 7(A) and 7(B) are characteristic diagrams of ghost channel.

FIG. 7(A) is a diagram showing a real ghost channel characteristic, and a reference symbol a represents a preghost, a symbol b is a proximity ghost, a symbol c is a postghost, and a symbol r represents a ghost cancellation reference signal.

Figure 7B:
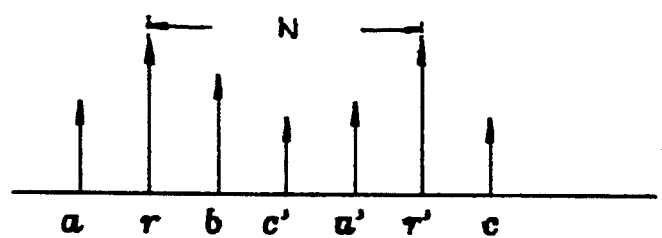

FIG. 7(B) is a diagram of a ghost channel characteristic showing a state that the preghost and the postghost are superposed at the proximity ghost region by a periodic sequence characteristic in case where the sequence length is limited as much as N by using a conventional periodic sequence as a television ghost cancellation reference signal. A reference symbol a' is a pseudoghost of the preghost a, and a symbol c' is a pseudoghost of the postghost c.

The preghost channel characteristic computing section 50 computes a ghost characteristic a of the preghost region, the proximity ghost channel characteristic computing section 40 computes a ghost characteristic b of the proximity ghost region and the false ghost a', c', and the postghost channel characteristic computing section 60 computes a ghost characteristic c.

The ghost channel characteristic computed as these passes through the adders 71, 74 whereby the false ghosts a', c' being present in the proximity ghost region are cancelled.

The cross-correlation section 17 utilizes a computed ghost channel characteristic and obtains a coefficient value of the ghost cancelling filter 19 and outputs to the ghost cancelling filter 19.

The ghost cancelling filter 19 made of FiR filter and IiR filter cancels a ghost inserted within the television signal inputted with a coefficient value in accordance with the ghost channel characteristic computed at the cross-correlation section 17. According to this, the television signal cancelled with the ghost is applied to the television receiving section 20 whereby a clear picture can be obtained.

By doing as these, a problem can be solved in which a ghost cancelling extent generated when a periodic sequence as a ghost cancellation reference signal is limited as much as N of the sequence length. And, the preghost and the postghost by the periodic sequence characteristic are not superposed at the proximity ghost region, and a multiplying operation increased in accordance with the periodic cross-correlation method of the periodic sequence can be remarkably reduced by using a linear cross-correlation method.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference

What is claimed is:

1. Television ghost cancellation device for a television system having transmitting and receiving sections, comprising:
   a ternary sequence generating section included in the transmitting section of the television system for generating a ternary training signal which is inserted within a vertical blanking interval of a video signal to be modulated at a radio frequency;
   a demodulating section which is included in the receiving section of the television system and for receiving a transmission signal from said transmitting section including the ternary training signal and demodulating the ternary training signal to an original video signal;
   a line selecting section for selecting a line having the ternary training signal in the vertical blanking interval of the original video signal demodulated at said demodulating section;
   a memory stored with a ternary sequence reference signal for comparison with the ternary training signal generated by said ternary sequence generating section;
   a cross-correlation section for computing a mutual correlation of said ternary sequence reference signal and said ternary training signal via the original video signal selected by said line selection section and determining a ghost channel having a filter coefficient; and
   a ghost channel filter for cancelling a ghost of the video signal in accordance with the filter coefficient of said ghost channel.

2. Television ghost cancelling device as defined in claim 1, wherein said demodulating section comprises:
   a radio frequency demodulating section for demodulating a radio frequency signal transmitted from said transmitting section to an intermediate frequency signal;
   an intermediate frequency demodulating section for demodulating said intermediate frequency signal to a basic low frequency band signal;
   a timing generating section for generating a clock signal from said basic frequency band signal; and
   A/D converter for converting said basic low frequency band signal into a digital signal.

3. Television ghost cancelling device for a television system in transmitting and receiving sections, comprising:
   a ternary sequence generating section included in the transmitting section of the television system for generating a ternary training signal which is inserted within a vertical blanking interval of a video signal to be modulated at a radio frequency;
   a demodulating section which is included in the receiving section of the television system and for receiving a transmission signal from said transmitting section including the ternary training signal and demodulating the ternary training signal to an original video signal;
   a line selecting section for selecting a line having the ternary training signal in the vertical blanking interval of the original video signal demodulated at said demodulating section;
   a memory stored with a ternary sequence reference signal for comparison with the ternary training signal generated by said ternary sequence generating section;
   a signal delay adding section for converting the ternary training signal into a delayed training signal;
   a cross-correlation section for computing a cross-correlation of said ternary sequence reference signal and said delayed training signal converted at said signal delay adding section and determining a ghost channel having a filter coefficient; and
   a ghost cancelling filter for cancelling a ghost of the video signal in accordance with the filter coefficient of said ghost channel.

4. Television ghost cancelling device as defined in claim 3, wherein said signal delay adding section comprises:
   three one-line delayers connected in series so as to delay in turn said training signals as much as said reference signal length; and
   a first adder for adding said delayed signal.

5. Television ghost cancelling device as defined in claim 3, wherein said cross-correlation section comprises:
   a proximity ghost channel characteristic computing section including a proximity reference signal memory, a two line delayer for delaying said proximity reference signal, and a first cross-correlater for computing a proximity ghost channel characteristic value from values of an output of said adding section and said two line delayer;
   a preghost channel characteristic computing section including a second cross-correlater for computing a preghost channel characteristic values from values of a pre-reference signal memory and an output of said pre-reference signal and said adding section, and a delayer for delaying an output value of said second cross-correlater;
   a postghost channel characteristic computing section including a post-reference signal memory, a delayer for delaying the post-reference signal, and a third cross-correlater for computing a postghost channel characteristic value from a delay value of said post-reference signal and an output value of said adding section;
   a second adder for computing outputs of said proximity, pre- and post-ghost channel characteristic computing sections;
   a delay section for delaying outputs of a delayer for delaying an output of said second adder and said postghost channel characteristic computing section; and
   a third adder for adding an output value of said preghost channel characteristic computing section and the output values of said delaying sections.

6. Television ghost canceling device as defined in claim 1, wherein said ternary training signal has a substantially ideal auto-correlation function with a single peak value.

7. Television ghost cancellation device for a television system, comprising:
   ternary sequence generating means for generating a ternary training signal by combining a ternary sequence with a video signal to be transmitted to a television receiver, said ternary training signal being cross-correlated with a ternary reference signal and inserted within a vertical blanking interval of the video signal and having a substantially ideal auto-correlation function; and a transmitter connected to said ternary sequence generating means and transmitting the ternary training signal to the television receiver for canceling signal dispersion experienced by the video signal during the transmitting of the video signal.

8. Television ghost cancellation device for a television system, comprising:

a receiver receiving a video signal including a ternary training signal from a television transmitter having a ternary sequence for canceling signal dispersion experienced during the transmitting of the ternary training signal; and signal dispersion cancellation means for canceling the signal dispersion experienced by the video signal by cross-correlating the ternary training signal with a reference ternary training signal to determine an offset and for removing the offset from the video signal, said ternary training signal inserted within a vertical blanking interval of the video signal and having a substantially ideal auto-correlation function.

* * * * *